No. 774,777. PATENTED NOV. 15, 1904.
E. POLTE.
AUTOMATIC REGISTERING WEIGHING MACHINE.
APPLICATION FILED JUNE 3, 1903.
NO MODEL. 3 SHEETS—SHEET 1.
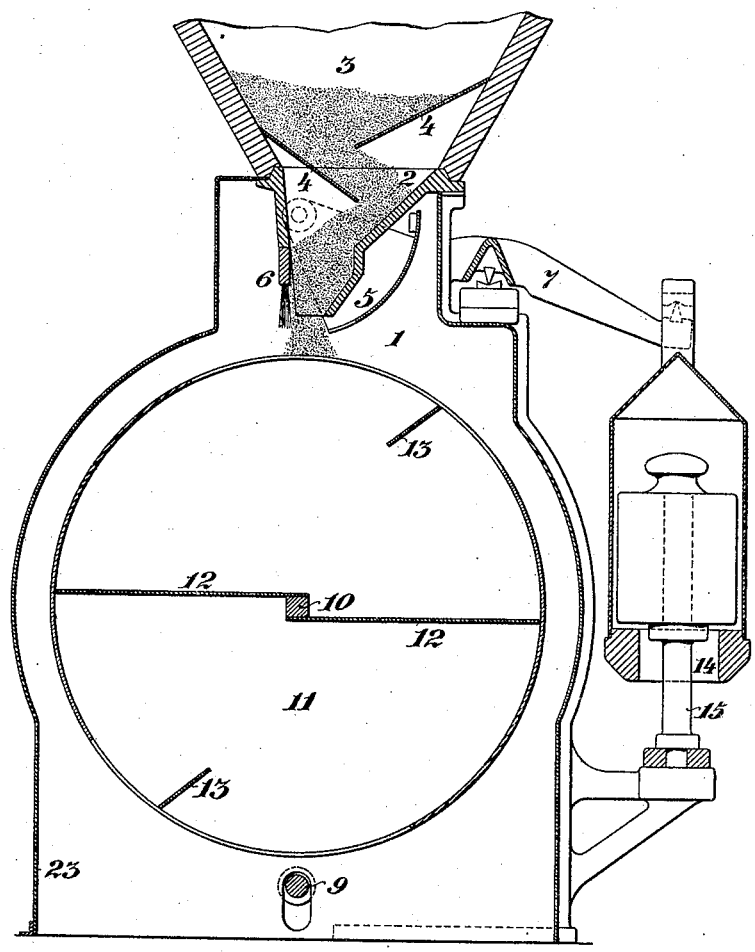
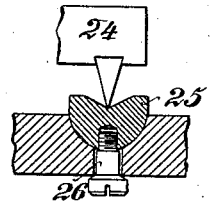
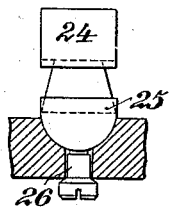
WITNESSES: INVENTOR:
Fred White Eugen Polte,
Thomas Wallace By his Attorneys No. 774,777. PATENTED NOV. 15, 1904.
E. POLTE.
AUTOMATIC REGISTERING WEIGHING MACHINE.
APPLICATION FILED JUNE 3, 1903.
NO MODEL. 3 SHEETS—SHEET 2.

WITNESSES:
Fred White
Thomas Mallay

INVENTOR:
Eugen Polte,
By his Attorneys

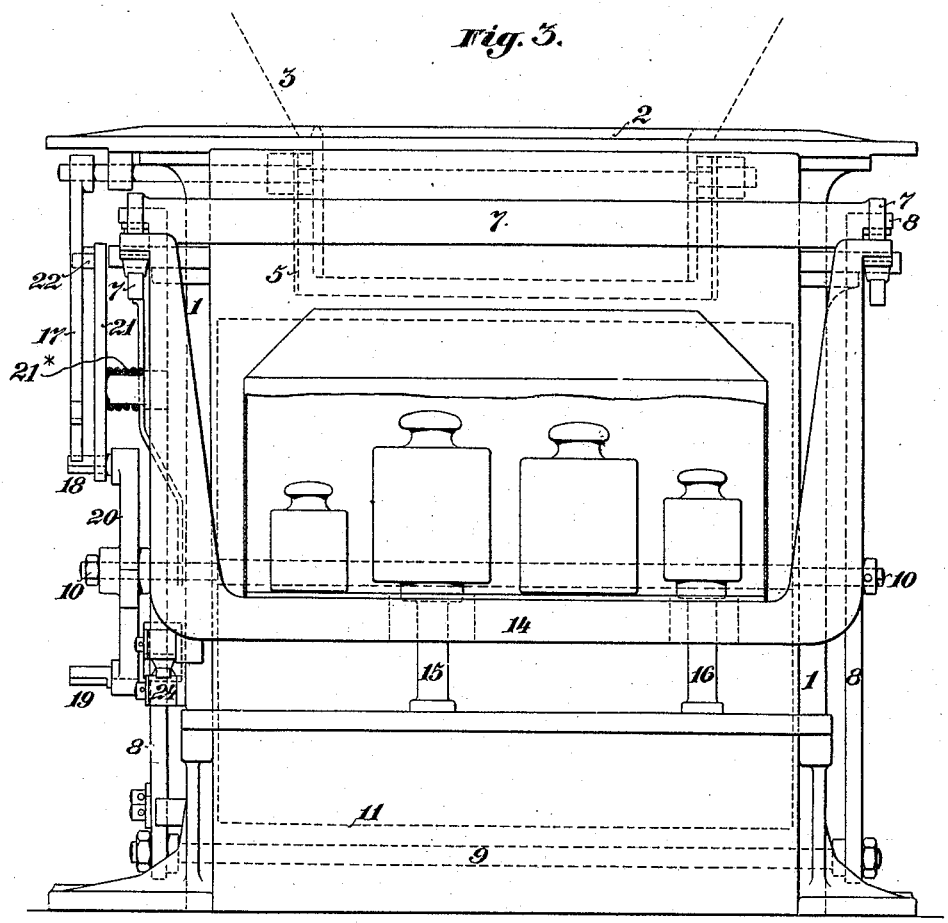
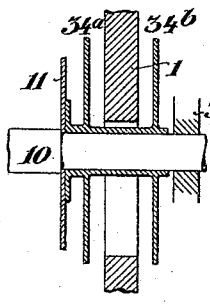
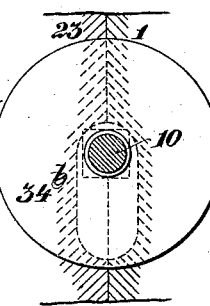

No. 774,777.

Patented November 15, 1904.

UNITED STATES PATENT OFFICE.

EUGEN POLTE, OF MAGDEBURG-SUDENBURG, GERMANY.

AUTOMATIC REGISTERING WEIGHING-MACHINE.

SPECIFICATION forming part of Letters Patent No. 774,777, dated November 15, 1904.

Application filed June 3, 1903. Serial No. 159,913. (No model.)

*To all whom it may concern:*

Be it known that I, EUGEN POLTE, manufacturer, a subject of the King of Prussia, German Emperor, residing at Magdeburg-Sudenburg, in the Kingdom of Prussia, Germany, have invented certain new and useful Improvements Relating to Automatic Registering Weighing Apparatus, of which the following is a full, clear, and exact description.

This invention relates to an automatic registering weighing apparatus which while capable of ascertaining the weight of materials accurately and rapidly combines simplicity of construction with durability.

In order to comply with the following requirements — viz., accuracy and speed in weighing, simplicity in construction, and lasting efficiency of the apparatus — this latter is constructed in a manner differing from other automatic registering weighing apparatuses hitherto known, which is explained by means of the following description.

One form of construction of the automatic registering weighing apparatus forming the subject of the present invention is shown by way of example in the accompanying drawings.

Figure 2:
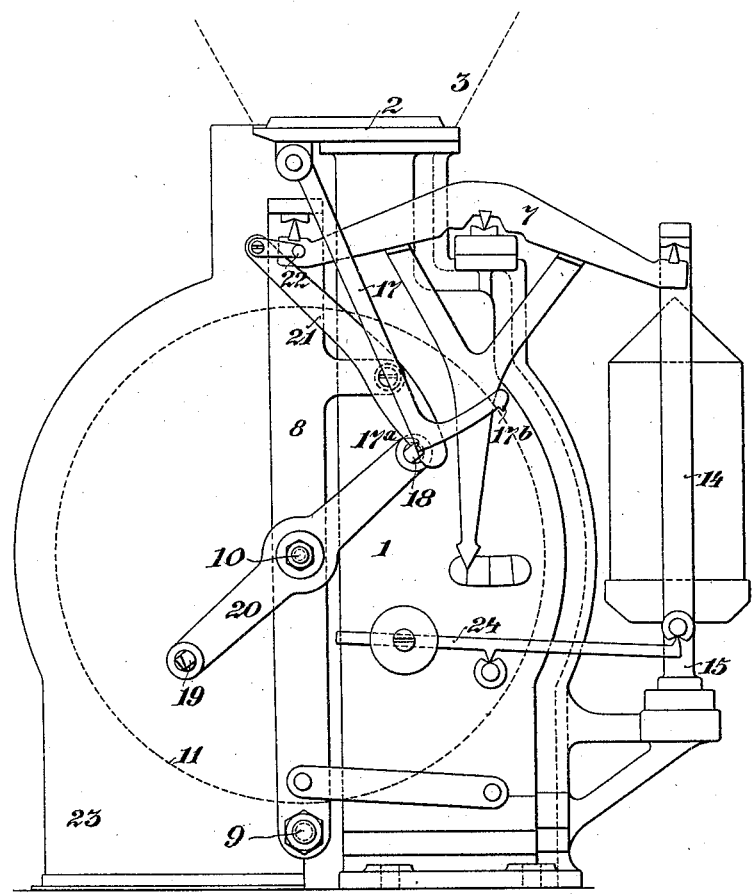

Figure 1 is a vertical section of the registering weighing apparatus. Fig. 2 is a side elevation, and Fig. 3 is a front elevation, of the same. Figs. 4 to 10 represent separate parts of the apparatus.

The frame of the apparatus consists of the two sides 1 1, and the cross-bar 2 serving as cross connection between them. On the top of the latter is placed the hopper 3 for receiving the materials to be weighed. Inside this hopper two oblique baffle-plates 4 are fixed for the purpose of counteracting the irregularities due to the varying heights to which the hopper is filled, and they cause the pressure on cut-off quadrant 5 to be constant and uniform. At its front part, which passes underneath the cut-off brush 6, the quadrant 5 is provided with one or more openings for regulating the afterflow. To a four-armed weighing-beam 7 are attached on one side two suspension-rods 8 8, each provided with a turned-over portion at the top and connected together at the bottom by a tie-rod $q$. At or near their middle they carry the spindle 10 of the revolving drum 11, which latter is divided by partitions 12 into two or more equal compartments. Inside each compartment a sheet-metal brake-strip 13, extending from one end of the drum to the other, is fixed at a suitable point on or near the circumference, so that as the goods being weighed impinge on these strips the drum is gradually brought to rest toward the end of the rotation. On the other side of the weighing-beam 7 the frame 14, carrying the weights, is suspended, on which frame, taking the case of a five-kilogram weighing apparatus, it is assumed that two weights of two kilograms and two weights of one-half kilogram are placed. Each weight rests firmly on the bottom tie of the carrying-frame 14.

In every weighing operation, particularly, however, where quick-acting automatic scales are concerned, it is of the greatest importance to overcome the inertia of the weights as gradually as possible. By so doing the balance action as well as the accuracy of the apparatus are improved. In the arrangement under consideration, therefore, one two-kilogram weight and one one-half-kilogram weight are each arranged, respectively, on supports 15 and 16, the height of which is determined as follows: As soon as materials of an aggregate weight of 2.5 kilograms have fallen into the drum, thus raising the frame 14, carrying the weights correspondingly, the second two-kilogram weight will be picked up by the bottom tie of the frame 14, and subsequently the second one-half-kilogram weight will be raised off its support in the same way. The heights at which these two weights, which may be termed "step-weights," are disposed on their supports are in definite relation to the movement of the cut-off quadrant 5 and to the corresponding movement of rocking lever 17. This latter performs the duty of two levers, which, if mounted separately, would regulate the twofold movement of the cut-off quadrant 5 in such a manner that after the release of the first lever at its contact-face $17^a$ has been effected the quadrant will be closed, all but its afterflow-openings. The contact-face $17^b$ represents the same lever, the release of which causes the afterflow-openings of the quadrant to be closed also. 17ª and 17ᵇ are joined together by a curved arm. The form given to the latter is such that it will deaden the movement of the drum during its downward travel, and thus have a steadying effect on the working of the apparatus. When the drum is divided into two compartments, the rocking lever 17 is governed by the action of two catches 18 and 19. Both are placed exactly opposite each other at the terminal bosses of the two-armed lever 20, Fig. 2. On the drum revolving the catches 18 and 19 act on the rocking lever 17 and raise same, together with the quadrant connected to it. Their further object is to retain the drum in the intake position during charging by means of locking-bar 21. To this end the locking-bar 21 is actuated by a spring 21*. (See Fig. 3.) At the upper end of the locking-bar the tappet 22 is fixed in such a position by a pin that the rocking lever 17 effects the release of catch 18 from the locking-bar the moment it strikes against tappet 22. The two-armed lever 20 is connected to the drum through its spindle 10. They are, however, kept sufficiently wide apart to leave room for the insertion of a drum-casing between the lever and drum end. This casing isolates the lower portion of the hopper with cut-off quadrant, as well as the drum, from all the other parts of the apparatus.

The apparatus is kept free from dust, on the one hand, by the sides of the frame 1 1 and the cross-bar 2 placed between them, and, on the other hand, by a sheet-metal casing 23, abutting against the latter and made easily removable. This is arranged against the sides 1 1, and thus made dust-tight.

Only the spindle 10 and tie-rod 9 protrude through the walls of the dust-casing, in which slotted openings are provided for the purpose.

The usual counterbalance-lever 24 requires no special description. The hemispherical form given to the cup 25, Figs. 4 and 5, facilitates its adjustment into the exact position relative to its knife-edge. A screw 26 serves to retain the cup in the correct position after adjustment.

Figure 6:
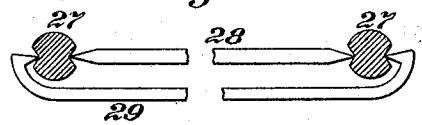
Figure 7:
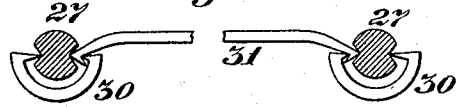

Figs. 6 and 7 illustrate two new devices for counter-guides.

Attached to the frame, as well as to the suspension-rod of the drum, are two round studs 27, each having two notches, all the four notches being in a horizontal plane when the balance is in the zero position. The distance-rod 28, ending in knife-edges, serves to keep the guide-rods asunder, while they are held together by a similar retaining-rod 29 with bent and chisel-edged ends or, as shown in Fig. 7, by crescent-shaped chisel-edged pieces 30, which engage on one side in a notch of the stud and on the other in the notch of the distance-rod 31.

Figure 8:
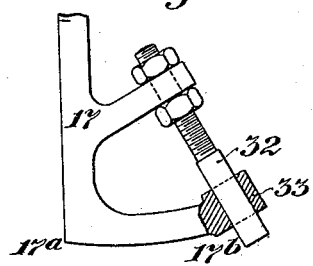

A substitute for the usual rocking lever 17 is represented in Fig. 8, by means of which it is rendered possible to advance or to retard the release of contact-face 17ᵇ from catch 18. In order to effect this purpose, the contact-face 17ᵇ of the prism-shaped rod 32 is made adjustable in such a way that it protrudes more or less through a corresponding guide-eye 33 of rocking lever 17. Rod 32 at its upper end is screw-threaded and is adjusted and fixed by means of two nuts. The main object of this adjustment is either to advance or to retard the cut-off of the afterflow, according to whether the contact-face 17ᵇ is at a shorter or greater distance from the shaft forming the pivot of rocking lever 17.

Figs. 9 and 10 show a section of the dust-casing and method of rendering drum-spindle 10 dust-proof. This is effected by the provision of two sheet-metal disks 34ª and 34ᵇ at each end, affixed to the spindle at the points shown, which reduce the liability of dust escaping from the dust-casing.

What I claim as my invention, and desire to secure by Letters Patent, is—

1. In a weighing apparatus, the combination with a beam and means for progressively counterbalancing the load, of a lever having two contact-faces and an intermediate curved surface, and a catch moving with the beam, said contact-faces adapted to successively engage said catch, and said parts being adapted to operate in such manner that a portion of the counterbalancing means is applied to the scale-beam when the first contact-face disengages from said catch, and a portion when the second contact-face makes such disengagement, and said curved surface being adapted to engage a part moving with the beam to deaden the oscillations of the latter.

2. In a weighing apparatus, the combination with a beam and means for progressively counterbalancing the load, of a lever having two contact-faces and an intermediate curved surface, a rotatable drum carried by the beam, and a plurality of catches carried by said drum, said contact-faces being adapted to successively engage each of said catches, and said parts being adapted to operate in such manner that a portion of the counterbalancing means is applied to the scale-beam when the first contact-face disengages from said catch, and a portion when the second contact-face makes such disengagement, and said curved surface being adapted to engage a part moving with the beam to deaden the oscillations of the latter.

3. In a weighing apparatus, the combination of a beam, a drum carried thereby, a cut-off mechanism for controlling feed thereto, means for progressively counterbalancing the load, a lever connected with such cut-off mechanism and adapted to operate the latter, said lever having two contact-faces and an intermediate curved surface, a catch moving with the drum, said contact-faces adapted to successively engage said catch, and said parts being adapted to operate in such manner that a part of the counterbalancing means is applied to the scale-beam when the first contact-face disengages from said catch and said lever operates said cut-off mechanism to partly close the same, and a part of said means is applied when the second contact-face makes such disengagement and said lever operates to wholly close said cut-off mechanism.

4. In a weighing apparatus, a counter-guide having two studs, each having two bearings, a member having knife-edges at its ends adapted to work in one bearing of each of said studs, and means preventing separation of such member from said studs having knife-edges working in the other bearings thereof.

5. In a weighing apparatus, a counter-guide having two studs each having outer and inner bearings, a member having knife-edges at its ends adapted to work in the inner bearings of said studs, and means preventing separation of such member from said studs having knife-edges working in the outer bearings thereof.

In witness whereof I have hereunto signed my name in the presence of two subscribing witnesses.

EUGEN POLTE.

Witnesses:
   Sarah C. McKellip,
   James L. A. Burrell.